3,031,395
STABILIZED EUROPIUM DIOXIDE FOR A CONTROL ROD

Walter Precht, Towson, and Harold N. Barr, Baltimore, Md., assignors, by mesne assignments, to the United States of America as represented by the United States Atomic Energy Commission
No Drawing. Filed Dec. 23, 1960, Ser. No. 78,188
3 Claims. (Cl. 204—193.2)

This invention relates to the development of a stable, hydration resistant form of europium oxide, for control application in reactors.

Due to its high neutron capture cross section, europium is considered as a most promising reactor control material. The concentrations of europium required for blackness in a control rod are much lower than for other useful control rod materials. In addition europium has a long range of high cross section degradation products so that endurance at high flux is increased. The most usable form of europium for control rod application is the oxide, $Eu_2O_3$. Europium oxide, though, as the other rare earth oxides, is highly susceptible to reaction and disintegration when exposed to high temperature water conditions. This is undesirable due to the resultant warpage of control rods containing dispersions of $Eu_2O_3$ and the added problem of release of soluble europium oxide in the water system causing possible flux distortion, as well as creating a serious accessibility problem, because of the radioactive isotope $Eu^{156}$ which decays and emits a 1.1 mev. gamma ray.

From the corrosion standpoint, it would be extremely desirable to use a stabilized, hydration resistant form of europium oxide. If a defect should occur in the cladding of a control rod using a stabilized form of $Eu_2O_3$, hydration and subsequent leaching would be greatly minimized. It should also be pointed out that there would be no reason to expect corrosion problems of a core using europium oxide as long as the cladding remains intact. It is the purpose of this invention to develop a stabilized, hydration resistant form of europium oxide which does not suffer distortion or leaching of europium in the event of possible exposure to high temperature water because of a defect in the cladding.

In order to determine the level of stability, samples of high purity, high fired $Eu_2O_3$ were prepared and tested. Pellets fired at 1550° C. and 1760° C. in air were subjected to water reflux testing and after 1½ hours lost their shape and were reduced to a powder. It has been found that certain europium oxide compositions are stabilized and do not suffer such warpage and disintegration. This stabilization is accomplished by solid solution formation between the europium oxide and certain metal oxides. Table 1 shows the results of stability tests of $Eu_2O_3$ compositions with certain metallic oxides in distilled water at ambient temperatures by refluxing at boiling point and in an autoclave at 570° C. and 1200 p.s.i. All of the mixtures shown in Table 1 were ceramic grade oxides, wet blended by hand with acetone, dried, pressed at approximately 5 t.s.i. and sintered at 1500°–1550° C. in air. Although europium oxide compositions containing added $Fe_2O_3$ or $SnO_2$ showed good hydration resistance, the $Eu_2O_3$ compositions containing added $TiO_2$ showed the most promise in that less overall weight change and highest europium density was found.

Table 1
EFFECT OF STABILIZER ADDITIONS TO $Eu_2O_3$

| Composition | Initial Wt. $Eu_2O_3$ | Initial Wt. Admix. | Initial Wt. | Wt. after 120 Hrs. $H_2O$ | Wt. after 160 Hrs. $H_2O$ | Wt. after 150 Hrs. Boil $H_2O$ | Wt. after 140 Hrs. Autoclave 570° F. at 1,200 p.s.i. | Wt. Percent Change |
|---|---|---|---|---|---|---|---|---|
| $Eu_2O_3+2SnO_2$ | 54.2 | 45.8 | .3806 | | .3845 | | | 1.02% gain. |
|  |  |  | .4936 | | | .4936 | | No change. |
|  |  |  | .4046 | | | | .4041 | .12% loss. |
| $Eu_2O_3+2TiO_2$ | 68.9 | 31.1 | .4925 | | .4925 | | | No change. |
|  |  |  | .6041 | | | .6041 | | Do. |
|  |  |  | .9415 | | | | .9412 | .04% loss. |
| $Eu_2O_3+Fe_2O_3$ | 69 | 31 | .5091 | | .5093 | | | .04% gain. |
|  |  |  | .6414 | | | .6408 | | .09% loss. |
|  |  |  | .6388 | | | | .6384 | .06% loss. |
| $Eu_2O_3+TiO_2$ | 81.8 | 18.2 | .7460 | .7457 | | | | .04% loss. |
|  |  |  | .6117 | .6115 | | | | .03% loss. |
| $Eu_2O_3+SnO_2$ | 70 | 30 | .6514 | .6512 | | | | .02% loss. |
|  |  |  | .6903 | .6906 | | | | .03% gain |
|  |  |  | .4949 | | | | .4942 | .07% loss. |

The metallic oxides used were a ceramic grade with a particle size of less than 1 micron. Powders of this type which are calcined at low temperatures during preparation and have a small particle size produce active particle surfaces which result in good sintering characteristics. The europium oxide was then hand blended with titanium oxide, pressed and sintered.

The hydration resistant blends, as shown in Table 1, must also be compatible with stainless steel when mixed to form a cermet and sintered in a reducing atmosphere. The data shown in Table 2 shows the effect of sintering cermets of stainless steels plus stabilized europium oxide compositions in a hydrogen atmosphere. The europium oxide-metallic oxide blends were divided into two groups and subjected to different heat treatments before incorporation into a cermet with stainless steel. One group was fired at 1550° C. in air only and the other was fired initially at 1550° C. in air and then refired at 1250° C. in $H_2$. The fired blends were then crushed to $-325$ mesh and then blended with stainless steel. The cermet blends consisted of 45 w/o ceramic (europium oxide+additive) plus 55 w/o stainless steel. The summation of results of the test shown in Table 2 are as follows:

(1) The ceramic blends containing $SnO_2$ and $Fe_2O_3$ additions were partially reduced during hydrogen firing. This partial reduction of the oxide blends released europium oxide to react with the silicon in the stainless steel matrix. This lead to deformation and expansion of these cermets during firing.

(2) Those blends fired only in air prior to incorporating as a cermet are somewhat protected by the metal matrix during subsequent hydrogen firing and water reflux testing.

(3) The europium oxide-titanium oxide $$(Eu_2O_3+2TiO_2)$$

containing cermets were the only samples to show a consistent volume decrease and maintain luster, after sintering in $H_2$.

(4) The europium oxide-titanium oxide $$(Eu_2O_3+2TiO_2)$$

containing cermets shows the most desirable overall properties in that it is stable against hydration and also stable against reaction with stainless steels containing silicon.

met pellets which showed a uniform shrinkage and no warpage or apparent reactions between the oxide and the stainless steel were subjected to boiling water reflux testing and showed a weight gain of 0.56% after 168 hours of test. Although the blend of 1:1 mol europium oxide to titanium oxide shows a lower resistance to hy-

*Table 2*

PROPERTIES OF EUROPIUM COMPOUNDS—STAINLESS STEEL CERMETS [1]

| Europium Materials | Type Stainless Matrix [2] | Sintered Density, g/cc. | Percent Volume Change After Sinter | Percent Weight Change After Water Reflux | Reflux Time (hrs.) |
|---|---|---|---|---|---|
| Air Fired, Then H₂ Fired: | | | | | |
| $Eu_2O_3+2TiO_2$ | High Silicon | 5.22 | −1.2 | −.035 | Total 168. |
| | Low Silicon | | | −.108 | Do. |
| | 18-8 elemental | 4.90 | −.7 | −.025 | Do. |
| $Eu_2O_3+SnO_2$ | High Silicon | 5.57 | +8.1 | | Failed 96. |
| | 18-8 elemental | 5.64 | +2.3 | | Failed 24. |
| $Eu_2O_3+Fe_2O_3$ | High Silicon | 5.24 | +10.5 | | Failed 60. |
| | Low Silicon | 5.36 | +2.9 | | Do. |
| | 18-8 elemental | 5.21 | +4.3 | | Do. |
| Air Fired Only: | | | | | |
| $Eu_2O_3+2TiO_2$ | High Silicon | 5.59 | −.7 | −.064 | Total 168. |
| | Low Silicon | 5.56 | −6.5 | −.017 | Do. |
| | 18-8 elemental | 4.73 | −12.3 | −.085 | Do. |
| $Eu_2O_3+SnO_2$ | High Silicon | 5.08 | +6.6 | −.475 | Do. |
| | Low Silicon | 5.84 | −10 | | Failed 96. |
| | 18-8 elemental | 5.41 | −.2 | | Do. |
| $Eu_2O_3+Fe_2O_3$ | High Silicon | 4.93 | +5.4 | −.191 | Total 168. |
| | Low Silicon | 4.76 | +7.3 | −.064 | Do. |
| | 18-8 elemental | | | | Failed 96. |

[1] All cermets contain 45 w/o Europium material and 55 w/o stainless steel and were sintered in hydrogen at 1250° C. for two hours.
[2] High Silicon means 3% silicon, Low Silicon means 2% silicon and 18-8 elemental means 18% chromium and 8% nickel.

Based on results of the test shown in Table 2 a cermet of 45 w/o europium oxide-titanium oxide (1:2 mol ratio) in 302b type stainless steel was prepared for testing. 302b type stainless steel is defined as containing .08 to 2% carbon, 17 to 19% chromium, 8 to 10% nickel, 2 to 3% silicon and a maximum of 2% manganese and was the only type stainless steel used. The europium oxide-titanium oxide blend was prepared as before, by wet blending by hand, drying, pressing at approximately 5 t.s.i. and sintering at 1500° C.–1550° C. in air. The ceramic blend was then crushed to a −325 mesh size and blended with 302b type stainless steel passing a 400 mesh screen. All of these cermets are pressed at 30 t.s.i. and sintered in a hydrogen atmosphere at 1250° for 2 hours. The autoclave testing conditions were 640° F., 2200 p.s.i. for 140 hours. The final weight losses averaged 0.06% with no dimensional changes.

It would be advantageous to increase the europium density in the stabilized europium oxide blend so that the cermet control rod may contain a higher stainless steel content. This would result in improved fabricability of the cermet, improved bonding of the cermet core to the cladding and greater protection afforded by the stainless steel matrix. The following shows the required amount of europium oxide blend necessary to maintain a europium density of 1.64 grams/cm.[3] in a stainless steel matrix control rod:

Weight percent oxide
(1) Europium oxide (no additive) _____ 30
(2) Europium oxide-titanium oxide (1:1 mol ratio) _____ 36.8
(3) Europium oxide-titanium oxide (1:2 mol ratio) _____ 42.6

A blend of 1:1 mol ratio of europium oxide to titanium oxide was then investigated. The europium oxide-titanium oxide blend was prepared and sintered by the same procedure as that used for the preparation of the previous 1:2 mol ratio blends. The sintered oxide blend was crushed to a −325 mesh size and blended with 302b stainless steel passing a 400 mesh screen. Compacts of this cermet blend were pressed at 30 t.s.i. and sintered at 1250° C. for 2 hours in hydrogen. The sintered cerdration than the 1:2 mol europium oxide-titanium oxide, the same desirable compatibility with high silicon stainless steel is achieved.

A major concern of the increased ceramic additions in the cermet cores for control rod purposes is the effect on fabricability. Control rods were fabricated by applying a stainless steel clad to the cermet to determine the effect of high additions of the ceramic. Two of these rods contained cores consisting of 1:2 mol ratio ($Eu_2O_3+TiO_2$) in type 302b stainless steel while two others had cores consisting of 1:1 mol ratio ($Eu_2O_3+TiO_2$) in type 302b stainless steel.

Various particle sized of the ceramic blend were used in both types of the 1:2 and 1:1 mol ratio. One core of each type had a particle size of −170 +200 mesh while the other cores, one of each type, utilized a particle size of −200 +325 mesh size. In each case the europium content was maintained equivalent to that found in a 30 w/o $Eu_2O_3$-stainless steel cermet. Prior to assembly, the sintered and coined cores (approximately 80% theoretical density) were flame sprayed with a .004–.005" layer of stainless steel. The surfaces sprayed were those which contacted the top and bottom clads. The object of spray cladding the cores was to promote bonding between core and clad in the early stages of rolling. The assemblies were heated to 1200° C. under vacuum and rolled. The rolling reductions averaged 10% per pass until an overall 3.5–1 reduction was achieved.

Gammagraphs of the as-rolled rods showed good "fill-in" of the core with no obvious defects. Metallographic examination indicated no cracking within the core and the existence of a good metallurgical bond, particularly at the core-clad interface where the flame sprayed stainless steel had been applied. Metallographic examination shows little difference in the effect of original particle size of oxide in the core.

The rods were tested in autoclaves in water at 640° F.–2200 p.s.i. for 140 hours. Dimensional examinations were made before and after testing, and no measurable changes were noted. The chemical analysis of the water from each autoclave showed less than 1 p.p.m. of europium from either test.

Thus, a useful stabilized, hydration resistant form of europium oxide can be achieved through the use of various oxide additions. Although $SnO_2$ and $Fe_2O_3$ show limited stability, the addition of $TiO_2$ with $Eu_2O_3$ has proven superior for use as a cermet component which is to be heat treated in a reducing atmosphere. Various additions of titanium oxide to europium oxide ranging from a 1:1 mol ratio to 2:1 mol ratio show stabilizing effects, with the high additions of titanium oxide showing greater stability. The use of cermet cores of high ceramic content, can be fabricated through normal hot rolling procedures. The addition of flame spray coating of stainless steel on the larger surfaces of the core greatly improved bonding.

Although not tested the substitution of other high cross section rare earth oxides in place of $Eu_2O_3$ would be expected to produce equivalent results.

We claim:

1. An article consisting of a composition ranging from 1 mole of europium oxide to 1 to 2 moles of an oxide taken from the group consisting of titanium oxide, stannic oxide and ferric oxide dispersed and clad in stainless steel.

2. A method of manufacturing the article defined in claim 1 consisting of crushing the ceramic blend to about 325 mesh size, blending the crushed blend with powdered stainless steel, forming a compact of the mixture, pressing the compact to 30 t.s.i., sintering at 1250° C. for 2 hours in hydrogen, and flame spraying to deposit a 0.004 to 0.005" layer of stainless steel.

3. The composition of matter consisting of from 1 mole of europium oxide to 1 to 2 moles of titanium oxide.

No references cited.

UNITED STATES PATENT OFFICE
CERTIFICATE OF CORRECTION

Patent No. 3,031,395　　　　　　　　　　　　　　　April 24, 1962

Walter Precht et al.

It is hereby certified that error appears in the above numbered patent requiring correction and that the said Letters Patent should read as corrected below.

In the heading to the printed specification, line 2, for "DIOXIDE" read -- OXIDE --.

Signed and sealed this 18th day of December 1962.

SEAL)
Attest:

ERNEST W. SWIDER　　　　　　　　　　　　　　　DAVID L. LADD
Attesting Officer　　　　　　　　　　　　　　　Commissioner of Patents